US012231819B2

(12) United States Patent
Fujimori

(10) Patent No.: US 12,231,819 B2
(45) Date of Patent: Feb. 18, 2025

(54) IMAGE DISPLAY METHOD AND PROJECTOR

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 230 days.

(21) Appl. No.: 17/946,088

(22) Filed: Sep. 16, 2022

(65) Prior Publication Data
US 2023/0080888 A1 Mar. 16, 2023

(30) Foreign Application Priority Data

Sep. 16, 2021 (JP) ................. 2021-150955

(51) Int. Cl.
H04N 9/31 (2006.01)
G03B 21/132 (2006.01)
G06F 3/14 (2006.01)
G06T 7/70 (2017.01)
G06V 10/25 (2022.01)
G06V 10/74 (2022.01)

(52) U.S. Cl.
CPC ............ H04N 9/31 (2013.01); G03B 21/132 (2013.01); G06F 3/14 (2013.01); G06T 7/70 (2017.01); G06V 10/25 (2022.01); G06V 10/761 (2022.01); G06T 2207/30204 (2013.01)

(58) Field of Classification Search
None
See application file for complete search history.

(56) References Cited

U.S. PATENT DOCUMENTS

| | | | |
|---|---|---|---|
| 2013/0050206 A1* | 2/2013 | Willis | G06F 3/0346 345/473 |
| 2020/0184932 A1 | 6/2020 | Fujimori et al. | |
| 2020/0275069 A1 | 8/2020 | Tanaka | |

FOREIGN PATENT DOCUMENTS

| | | |
|---|---|---|
| CN | 110221797 A | 9/2019 |
| CN | 111614947 A | 9/2020 |
| JP | 2020-92337 A | 6/2020 |

* cited by examiner

Primary Examiner — Frank S Chen
(74) Attorney, Agent, or Firm — Dority & Manning, P.A.

(57) ABSTRACT

An image display method includes displaying, on a display surface, a first image based on first image data from a first input source; and establishing a correspondence between a feature of a first marker and the first input source when it is detected that the first marker is placed in a detection area included in the display surface while the first image is displayed on the display surface.

20 Claims, 10 Drawing Sheets

IMAGE DISPLAY METHOD AND PROJECTOR

The present application is based on, and claims priority from JP Application Serial Number 2021-150955, filed Sep. 16, 2021, the disclosure of which is hereby incorporated by reference herein in its entirety.

BACKGROUND

1. Technical Field

The present disclosure relates to an image display method and a projector.

2. Related Art

According to the related art, a technique of deciding a position where a projector displays a video, according to the position of a marker detected on a display surface, is known. In a configuration disclosed in JP-A-2020-92337, when a user places a marker according to a position where an image is to be displayed, an image corresponding to the marker is displayed at the position corresponding to the marker.

In the configuration disclosed in JP-A-2020-92337, a correspondence between a marker and an image needs to be established in advance. It is demanded that this work should be done more easily.

SUMMARY

An aspect of the present disclosure is directed to an image display method including: displaying, on a display surface, a first image based on first image data outputted from a first input source; detecting that a first marker is placed in a detection area included in a detection surface; and establishing a correspondence between a feature of the first marker and the first input source when it is detected that the first marker is placed in the detection area while the first image is displayed on the display surface.

Another aspect of the present disclosure is directed to a projector including: a projection device including a light source, a modulation device modulating light emitted from the light source and thus emitting image light, and an optical projection system projecting the image light onto a display surface; an image capture device capturing an image of a detection area included in a detection surface and outputting captured image data; and a processor. The processor causes the projection device to project a first image based on first image data inputted from a first input source. The processor detects that a first marker is placed in the detection area, based on the captured image data, and establishes a correspondence between a feature of the first marker and the first input source when it is detected that the first marker is placed in the detection area while the first image is projected.

DESCRIPTION OF EXEMPLARY EMBODIMENTS

1. Outline of Projection System

Figure 1:
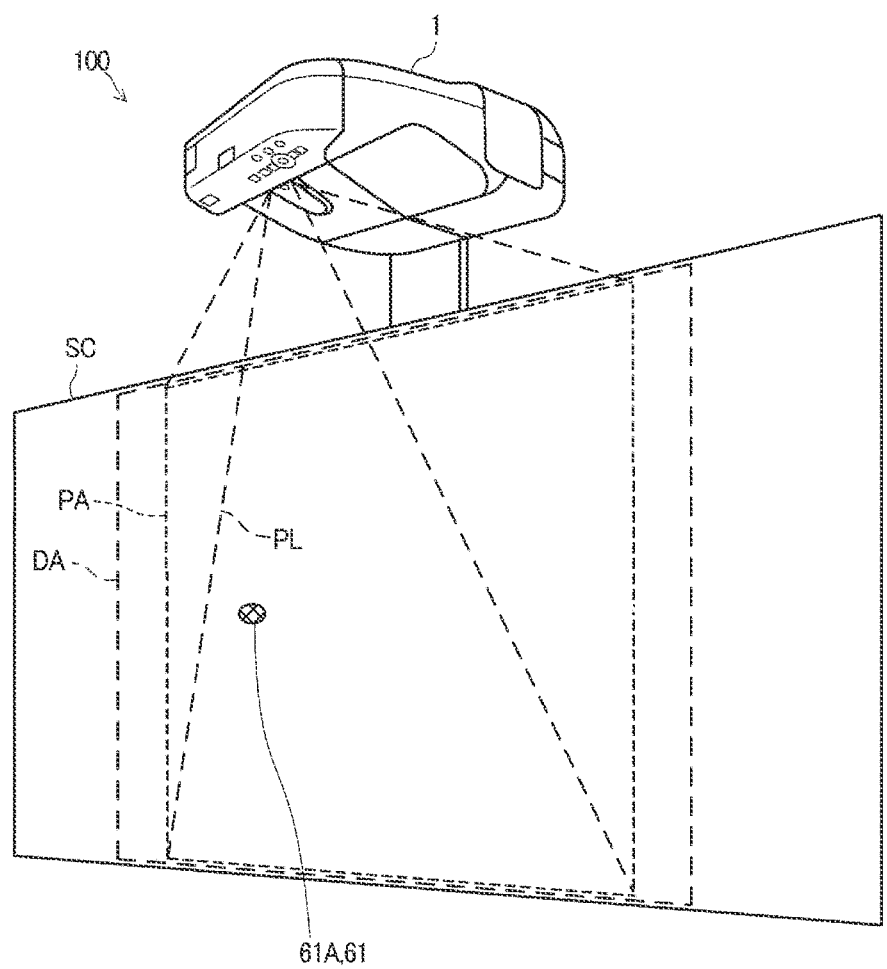
FIG. 1 shows the configuration of a projection system.

FIG. 1 is a perspective view of a projection system 100 according to an embodiment of the present disclosure.

The projection system 100 has a projector 1. The projector 1 is equivalent to an example of a display device. The projector 1 projects image light PL onto a screen SC as a display surface and thus displays an image on the screen SC.

The screen SC is, for example, a planar surface such as a wall surface, or a curtain suspended from above, and may be in any form that can reflect the image light PL emitted from the projector 1 and thus form an image. For example, a black board or white board on which one can write something may be used as the screen SC.

The projector 1 projects the image light PL onto the screen SC and thus forms a projection image on the screen SC. An area where the projector 1 can project the image light PL is defined as a projection area PA. The projection area PA can be said to be an available display area where the projector 1 can display an image. When the projector 1 is in the normal state of use, the projection area PA is projected to fit within the screen SC. An image projected by the projector 1 may be a still image or a video. The video refers to a so-called dynamic image. In the description below, the image projected by the projector 1 is referred to as a projection image and the projection image may be a still image or a video.

The projector 1 has a function of detecting a marker 61 placed on a detection surface. The detection surface may be the same surface as the screen SC, which is the display surface, or may be a different surface. The detection surface may also be a surface set at a different position from the screen SC on the same surface as the display surface. In this embodiment, an example where the detection surface is the same surface as the screen SC, that is, an example where the screen SC is the detection surface, is described. Also, a range where the projector 1 detects the marker 61 is defined as a detection surface DA. The detection surface DA and the projection area PA may or may not overlap each other. In this embodiment, the detection surface DA includes the projection area PA. The detection surface DA may coincide with the projection area PA. However, in this embodiment, the detection surface DA is broader than the projection area PA.

The number of markers 61 available in the projection system 100 is not limited. In the description below, markers 61A, 61B, 61C are given. These markers are referred to as the marker 61 when not distinguished from each other.

The marker 61 may be optically identifiable as different from the part other than the marker 61 in the detection surface. The marker 61 may be an independently movable object or may be a pattern or state formed on the screen SC. For example, the marker 61 is an object pasted or attached to the screen SC. As a method for attaching the marker 61, an adhesive material, a sucking disc, or a magnetic attraction force may be used. Also, for example, the marker 61 is a pattern, character, geometric shape or the like drawn in the detection surface DA on the screen SC. The marker 61 may be a pattern, character, geometric shape or the like formed by measures other than pasting, placing, or drawing. The user can detach, remove, or erase the marker 61 from the screen SC. For example, the user can manually move the marker 61 and can fix the marker 61 to any position on the screen SC. The marker 61A shown in FIG. 1 is a disc-like object.

The projector 1 can detect a feature of the marker 61. The feature of the marker 61 refers to an optically identifiable attribute. The optical identifiable attribute is not limited to an attribute that can be detected or identified using visible light but also includes an attribute that can be detected or identified using infrared light or ultraviolet light. For example, the feature of the marker 61 is the apparent color, pattern, or shape thereof.

2. Configuration of Projector

The projector 1 has a projection device 20. The projection device 20 has a light source 21, a modulation device 22, and an optical unit 23. A light source drive circuit 24 and a modulation device drive circuit 25 operating under the control of a controller 10 are coupled to the projection device 20. The projection device 20 is equivalent to an example of a display. The optical unit 23 is equivalent to an example of an optical projection system.

The light source 21 is formed by a solid-state light source such as an LED or a laser light source. The light source 21 may be a lamp such as a halogen lamp, a xenon lamp, or an ultra-high-pressure mercury lamp. The light source 21 is driven by the light source drive circuit 24 and thus emits light. The projector 1 may have a drive circuit supplying electric power to the light source 21 under the control of the controller 10.

The modulation device 22 modulates light emitted from the light source 21, thus generates the image light PL and casts the image light PL onto the optical unit 23. The modulation device 22 has a light modulation element such as a transmission-type liquid crystal light valve, a reflection-type liquid crystal light valve, or a digital mirror device. The light modulation element of the modulation device 22 is coupled to the modulation device drive circuit 25. The modulation device drive circuit 25 drives the light modulation element of the modulation device 22 and thus causes the light modulation element of the modulation device 22 to sequentially form an image on a per-line basis and to finally form an image on a per-frame basis. The modulation device 22 may have a drive circuit driving the light modulation element. For example, when the modulation device 22 is formed by a liquid crystal light valve, the modulation device 22 may have a liquid crystal driver circuit as the drive circuit.

The optical unit 23 has an optical element such as a lens and a mirror. The optical unit 23 causes the image light PL to form an image on the screen SC and thus displays a projection image on the screen SC.

The projector 1 has the controller 10, an image capture device 30, an interface 41, an image processing circuit 42, a frame memory 43, an input processing circuit 45, a remote control light receiver 46, and an operation panel 47.

The controller 10 has a processor 11 and a memory 15. The processor 11 may be formed by a single processor or a plurality of processors. The processor 11 may be formed by a SoC (system on chip) integrated with a part or the entirety of the memory 15 and/or another circuit. As described above, the processor 11 may be formed by a combination of a CPU (central processing unit) executing a program and a DSP (digital signal processor) executing predetermined arithmetic processing. All the functions of the processor 11 may be installed in hardware or may be configured using a programmable device. The processor 11 may also function as the image processing circuit 42. That is, the processor 11 may execute the function of the image processing circuit 42.

The memory 15 is a storage device storing a program executed by the processor 11 and data in a non-volatile manner. The memory 15 is formed by a semiconductor storage element such as a magnetic storage device or a flash ROM (read-only memory), or other types of non-volatile storage devices.

The memory 15 may include a RAM (random-access memory) forming a work area for the processor 11. The memory 15 stores data processed by the controller 10 and a control program executed by the processor 11. The memory 15 stores, for example, a control program 16, setting data 17, correspondence data 18, and captured image data D.

The control program 16 is a program executed by the processor 11. The setting data 17 includes data that is preset for functions and operations of the projector 1. The correspondence data 18 is data about the correspondence between a feature of the marker 61 and an input source selected by the projector 1.

The image capture device 30 is a so-called digital camera. The image capture device 30 executes image capture under the control of the controller 10 and outputs the captured image data D. The image capture range of the image capture device 30, that is, the angle of view, includes the detection surface DA.

The image capture device 30 has a CMOS (complementary metal-oxide semiconductor) image sensor or a CCD (charge-coupled device) image sensor. The image capture device 30 has a data processing circuit generating the captured image data D from the light receiving state of the image sensor. The image capture device 30 may be configured to capture an image based on visible light or may be configured to capture an image based on light with a wavelength outside the visible range, such as infrared light or ultraviolet light.

The captured image data D is not limited to any specific format. For example, the captured image data D may be raw data or image data in the JPEG (Joint Photographic Experts Group) format. Alternatively, the captured image data D may be image data in the PNG (Portable Network Graphics) format or other formats. The image capture device 30 performs color image capture and outputs the captured image data D of a color image.

The interface 41 is an interface to which image data is inputted, and has a connector to which a transmission cable is coupled, not illustrated, and an interface circuit receiving image data via the transmission cable. For example, the interface 41 has an HDMI (High-Definition Multimedia Interface) interface. The HDMI interface includes a connector for coupling an HDMI cable, and an interface circuit receiving image data in a transmission format conforming to the HDMI standard. Also, for example, the interface 41 has an analog interface. The analog interface includes a D-sub connector and a D-sub interface circuit. The D-sub interface circuit has an analog-digital conversion circuit. HDMI is a registered trademark.

Also, for example, the interface 41 has a USB (Universal Serial Bus) interface. The USB interface includes a USB connector and a USB interface circuit. Also, for example, the interface 41 has a LAN (Local Area Network) interface. The LAN interface includes an Ethernet connector, and a LAN interface circuit performing data communication in a transmission format conforming to the TCP/IP standard. Ethernet is a registered trademark. The interface 41 is not limited to these examples and may have a connector and an interface circuit that can transmit various data including image data. The interface 41 may also have a wireless communication device and may be configured to receive image data via a wireless communication line.

Figure 2:
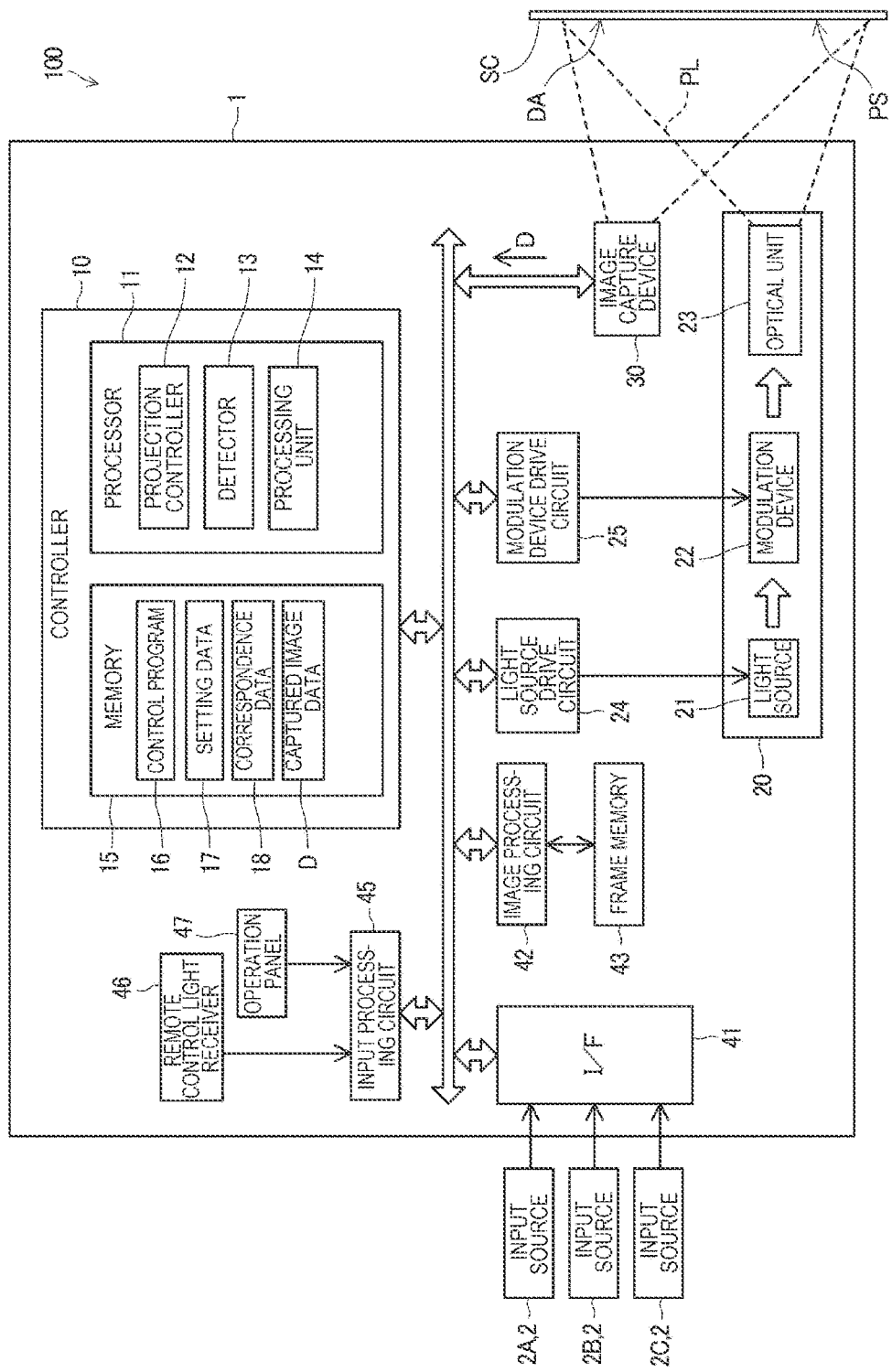
FIG. 2 is a block diagram of a projector.

A plurality of input sources 2 can be coupled to the interface 41. The input source 2 refers to a device outputting image data to the projector 1. FIG. 2 shows an example where three input sources 2A, 2B, 2C are coupled to the interface 41. However, the number of input sources 2 that can be coupled to the interface 41 is not limited.

The input source 2 is, for example, a laptop PC (personal computer), a desktop PC, a tablet terminal, a smartphone, or a PDA (personal digital assistant). The input source 2 may be a video player, a DVD (digital versatile disk) player, a Blu-ray disc player or the like. The input source 2 may also be a hard disk recorder, a television tuner device, a CATV (cable television) set-top box, a video game machine or the like.

The input sources 2A, 2B, 2C are coupled respectively to different connectors or wireless communication lines provided in the interface 41. In this embodiment, the input source 2A is coupled to the HDMI interface. The input source 2B is coupled to the USB interface. The input source 2C is coupled to the LAN interface.

The projector 1, under the control of the controller 10, causes the projection device 20 to project an image based on image data inputted to the interface 41. The projector 1 has a function of selecting a predetermined number of image data, of the image data inputted to the interface 41. In this case, the projector 1 selects the interface or the wireless communication line to which the input source 2A, 2B, 2C is coupled in the interface 41, and thus selects the input source 2A, 2B, 2C. For example, the projector 1 selects the LAN interface of the interface 41 when selecting image data inputted from the input source 2C. In this way, the projector 1 selects an interface provided in the interface 41 when selecting image data to be displayed on the screen SC.

The projector 1 may not only designate the input source 2A, 2B, 2C of the interface 41, based on the interface, the connector or the communication line, but also may select the input source 2A, 2B, 2C, based on more detailed information. For example, the controller 10 may regard the LAN interface of the interface 41 as one input source 2. The controller 10 may also regard one network address in the LAN connected to the interface 41, as one input source 2. The computer name or the device name may be used instead of the network address.

The image processing circuit 42 can be formed by an integrated circuit, for example. The integrated circuit is formed by an LSI (large scale integration), for example. More specifically, the image processing circuit 42 is formed by an ASIC (application-specific integrated circuit), a PLD (programmable logic device) or the like. The PLD includes an FPGA (field-programmable gate array), for example. A part of the configuration of the integrated circuit may include an analog circuit. A combination of a processor and an integrated circuit may be employed. The combination of a processor and an integrated circuit is referred to as a microcontroller (MCU), SoC, system LSI, chip set or the like.

The frame memory 43 may be coupled to the image processing circuit 42. The frame memory 43 is formed by an SDRAM (synchronous dynamic random-access memory), for example. In this case, the image processing circuit 42 loads image data inputted from the interface 41 into the frame memory 43. The image processing circuit 42 executes image processing on the image data loaded in the frame memory 43. The image processing executable by the image processing circuit 42 is, for example, resolution conversion processing, geometric correction processing, digital zoom processing, image correction processing for adjusting the color tone and luminance of the image, and the like.

The image processing circuit 42 performs, for example, geometric correction processing for correcting a keystone distortion of the projection image, various kinds of processing including OSD (on-screen display) processing for superimposing an OSD image, image adjustment processing for adjusting the luminance and color tint, and the like.

The image processing circuit 42 generates an image signal based on the image data on which image processing has been done. The modulation device 22 generates the image light PL based on the image signal generated by the image processing circuit 42.

The input processing circuit 45 accepts an input to the projector 1. The input processing circuit 45 is coupled to the remote control light receiver 46 receiving an infrared signal transmitted from a remote controller, not illustrated, and the operation panel 47 provided at the main body of the projector 1.

The remote control light receiver 46 receives an infrared signal transmitted from the remote controller, not illustrated. The remote control light receiver 46 decodes the received infrared signal and thus generates an operation signal. The remote control light receiver 46 outputs the generated operation signal to the input processing circuit 45.

The configuration where the remote controller and the remote control light receiver 46 transmit and receive an infrared signal is an example. For example, a configuration where the remote controller and the remote control light receiver 46 execute short-range wireless communication such as Bluetooth communication and thus transmit and receive an operation signal may be employed. Bluetooth is a registered trademark.

The operation panel 47 has various buttons and switches provided at a surface of the casing of the projector 1. The operation panel 47 generates an operation signal corresponding to an operation of a button or a switch and outputs the operation signal to the input processing circuit 45.

The input processing circuit 45 decodes a signal received by the remote control light receiver 46 and detects an operation by the remote controller. The input processing circuit 45 also detects an operation on the operation panel 47. The input processing circuit 45 outputs data representing the content of the operation to the controller 10.

The processor 11 executes the control program 16 stored in the memory 15 and thus functions as a projection controller 12, a detector 13, and a processing unit 14.

The projection controller 12 controls the image processing circuit 42, the light source drive circuit 24, and the modulation device drive circuit 25, and thus causes the projection device 20 to project the image light PL.

The detector 13 detects the marker 61. The detector 13 causes the image capture device 30 to execute image capture and causes the memory 15 to temporarily store the captured image data D outputted from the image capture device 30. The detector 13 extracts an image of the marker 61 from the captured image data D. For example, the detector 13 executes image processing such as boundary detection or pattern matching on the captured image data D and thus extracts an image of the marker 61.

The detector 13 detects the feature of the marker 61, based on the extracted image of the marker 61. The feature of the marker 61 is an optically identifiable attribute, as described above.

Figure 3:
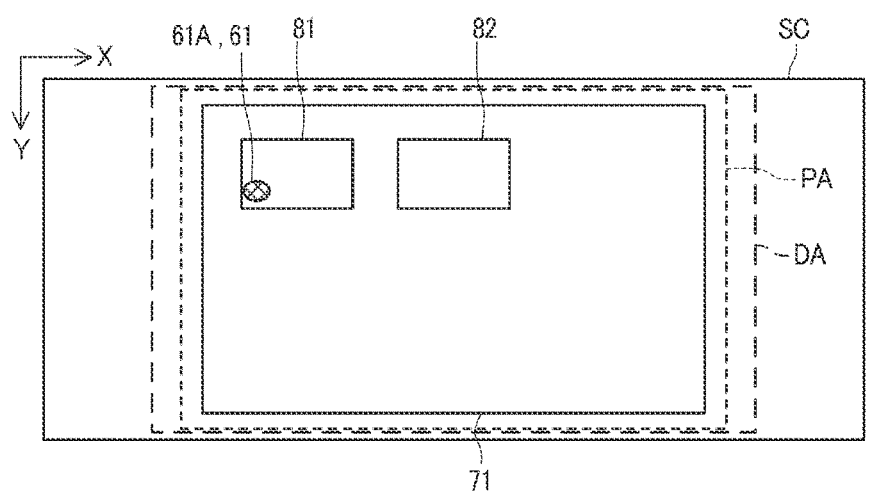
FIG. 3 is an explanatory view showing a first operation mode of the projector.

The detector 13 specifies the position of the marker 61 on the detection surface DA, based on the captured image data D. The position of the marker 61 is expressed, for example, in the form of X-Y coordinates set on the detection surface DA as shown in FIG. 3, described later. The detector 13 may express the position of the marker 61 in the form of coordinates in the projection area PA.

The detector 13 can detect the marker 61 in the entirety of the detection surface DA. The detector 13 sets a designated area 81 and a set area 82 as specified areas for detecting the marker 61.

The designated area 81 and the set area 82 are areas set within the detection surface DA and are rectangular areas, for example. The positions and sizes of the designated area 81 and the set area 82 are designated by the setting data 17, for example. The shapes, positions, and sizes of the designated area 81 and the set area 82 can be changed arbitrarily. The set area 82 is equivalent to an example of a detection area.

When the detector 13 has detected that the marker 61 exists on the detection surface DA, the detector 13 determines whether the position of the detected marker 61 is in the designated area 81 or not, and whether the position of the detected marker 61 is in the set area 82 or not. The detector 13 may be configured to detect whether the marker 61 exists in the designated area 81 or not. Similarly, the detector 13 may be configured to detect whether the marker 61 exists in the set area 82 or not.

The detector 13 may cause the projection device 20 to display an image showing one or both of the designated area 81 and the set area 82. For example, the detector 13 causes the projection device 20 to display a frame showing a boundary between the designated area 81 and the area other than the designated area 81. Also, for example, the detector 13 causes the projection device 20 to display a frame showing a boundary between the set area 82 and the area other than the set area 82. The detector 13 causes an image of these frames to be displayed, for example, in the form of an OSD.

A specific form of the designated area 81 and the set area 82 will be described later.

The processing unit 14 causes the projector 1 to operate, based on the feature of the marker 61 and the position of the marker 61 detected by the detector 13.

Specifically, when the marker 61 is detected by the detector 13 and the position of the marker 61 is in the set area 82, the processing unit 14 performs processing to establish the correspondence between the feature of the marker 61 and the input source 2. In this case, the processing unit 14 generates information representing the correspondence between the feature of the marker 61 and the input source 2 and causes the memory 15 to store the information as the correspondence data 18.

When the marker 61 is detected by the detector 13 and the position of the marker 61 is in the designated area 81, the processing unit 14 refers to the correspondence data 18. The processing unit 14 specifies the input source 2 corresponding to the feature of the detected marker 61, based on the correspondence data 18. The processing unit 14 causes the projection controller 12 to select the specified input source 2. The projection controller 12 selects the input source 2 of the interface 41. The projection controller 12 causes the projection device 20 to display an image based on the selected input source 2.

With the functions of the detector 13 and the processing unit 14, the user can easily perform an operation to establish the correspondence between the input source 2 and the marker 61. The user operates the remote controller, not illustrated, or the operation panel 47, and thus causes the projector 1 to select the input source 2 that is desired to correspond to the marker 61. When the user places the marker 61 in the set area 82 while the projector 1 is displaying an image based on the input source 2 that the user has caused the projector 1 to select, the correspondence between the feature of the marker 61 placed by the user and the currently displayed input source 2 is established. When a plurality of markers 61 having different features are available for use, the user can establish the correspondence between each of the plurality of markers 61 and a different input source 2.

For example, when the marker 61A is defined as a first marker, the correspondence data 18 establishes the correspondence between the feature of the marker 61A and the input source 2 as a first input source. Thus, the marker 61A is made to correspond to a projection image 71A based on first image data outputted from the input source 2 as the first input source. Similarly, for example, when the marker 61B is defined as a second marker, the correspondence data 18 establishes the correspondence between the feature of the marker 61B and the input source 2 as a second input source. Thus, the marker 61B is made to correspond to a projection image 71B based on second image data outputted from the input source 2 as the second input source.

Subsequently, the user places the marker 61 in the set area 82 and thus can cause the input source 2 corresponding to the feature of the placed marker 61 to be selected. Therefore, the user can cause an image based on the desired input source 2 to be displayed, by an easier operation than the operation on the remote controller or the operation panel 47.

The setting state of the designated area 81 and the set area 82 on the detection surface DA, and an operation of the projector 1 corresponding to this setting state are referred to as an operation mode of the projector 1. A plurality of operation modes of the projector 1 can be employed. Hereinafter, five operation modes of the projector 1 will be described in order.

The correspondence data 18 may be erased every time the power of the projector 1 is turned off, or may be reset every time the power of the projector 1 is turned on. Also, for example, the storage area storing the correspondence data 18 in the memory 15 may be a volatile storage area. In this case, the correspondence data 18 is initialized every time the power of the projector 1 is turned on or off. Therefore, for example, a user of the projector 1 used by a plurality of users can use the projector 1 comfortably without being influenced by the content set by the other user (s). The correspondence data 18 may be given a name according to a preset naming rule and a plurality of correspondence data 18 may be stored in the memory 15 in a non-volatile manner.

3. First Operation Mode of Projector

FIG. 3 is an explanatory view showing a first operation mode of the projector 1.

In the first operation mode, one designated area 81 and one set area 82 are set on the detection surface DA. The positions of the designated area 81 and the set area 82 may be within the projection area PA or outside the projection area PA.

In the example shown in FIG. 3, one projection image 71 is displayed in the projection area PA, and the designated area 81 and the set area 82 are set in a range overlapping the projection image 71. The marker 61A is placed in the designated area 81. In this example, the marker 61A is equivalent to the first marker.

Figure 4:
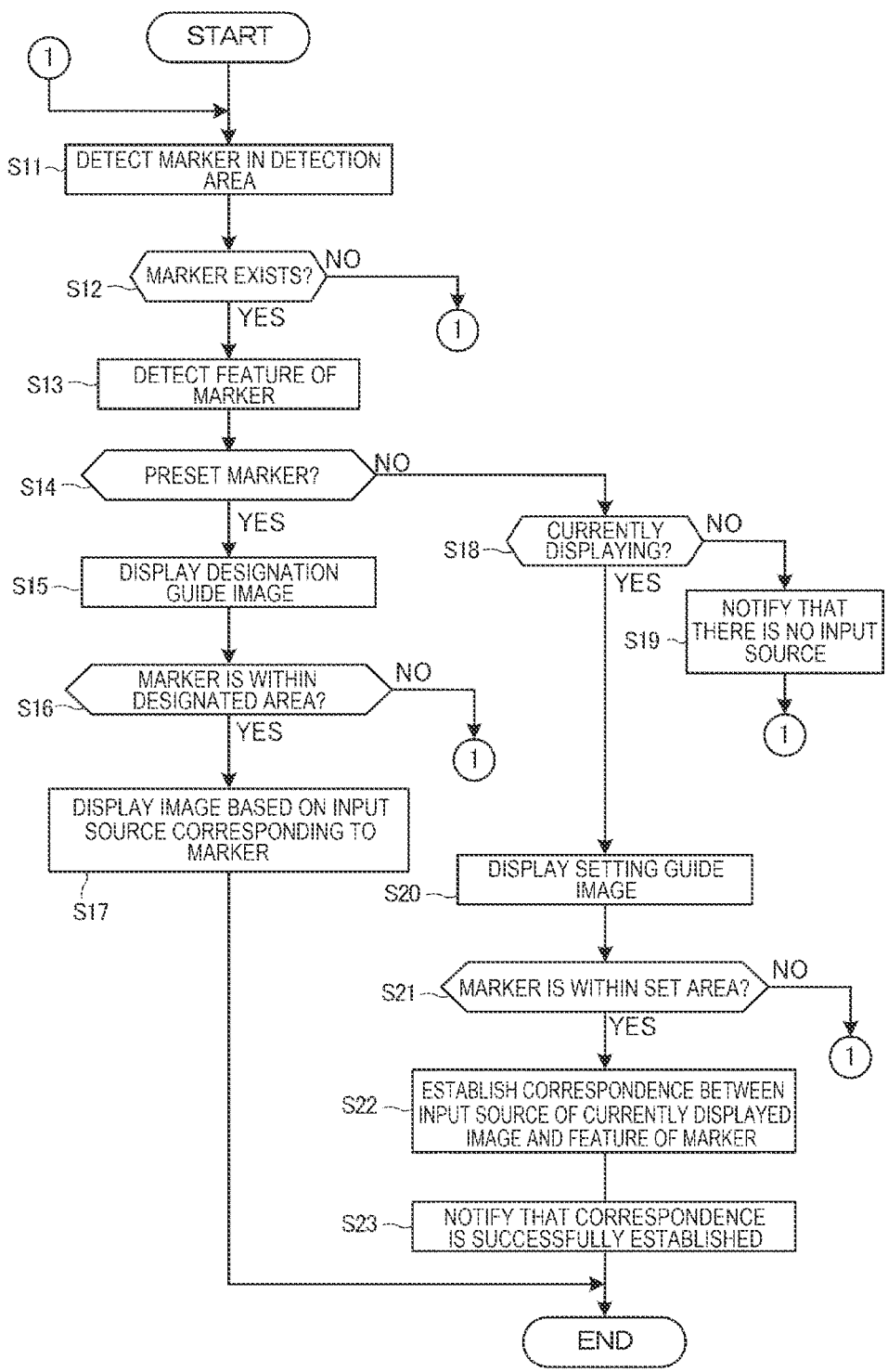
FIG. 4 is a flowchart showing an operation of the projector.

FIG. 4 is a flowchart showing an operation of the projector 1.

The operation shown in FIG. 4 is started, for example, in the state where the power of the projector 1 is on and where the marker 61 is not placed on the detection surface DA.

In step S11, the detector 13 attempts to detect the marker 61 on the detection surface DA. In step S12, the detector 13 determines whether the marker 61 exists or not. When determining that the marker 61 does not exist (NO in step S12), the detector 13 returns to step S1/ and attempts to detect the marker 61 in a preset cycle.

When determining that the marker 61 exists (YES in step S12), the detector 13 shifts to step S13. In step S13, the detector 13 detects the feature of the marker 61.

In step S14, the processing unit 14 refers to the correspondence data 18, based on the feature of the marker 61 detected by the detector 13 in step S13. The processing unit 14 then determines whether the marker 61 detected by the detector 13 is the marker 61 that is already set by the correspondence data 18 or not.

When determining that the marker 61 is the already set marker 61 (YES in step S14), the processing unit 14 shifts to step S15. In step S15, the processing unit 14 causes the projection device 20 to display a designation guide image showing the designated area 81. The designation guide image is an image showing the position and size of the designated area 81 and is, for example, an image of the frame of the designated area 81 shown in FIG. 3. The color of the designation guide image and the thickness of the frame are arbitrary. However, it is desirable that the designation guide image is visually distinguishable from the image currently displayed in the projection area PA by the projector 1 and the background color of the screen SC. In step S15, for example, the processing unit 14 causes the image processing circuit 42 to execute OSD processing and thus generate the designation guide image.

After the designation guide image is displayed, in step S16, the detector 13 determines whether the position of the marker 61 is within the designated area 81 shown in the designation guide image or not. In step S16, for example, when the marker 61 overlaps the frame of the designated area 81, the detector 13 regards the marker 61 as within the designated area 81. The same applies to the set area 82, described later.

When determining that the position of the marker 61 is not within the designated area 81 (NO in step S16), the detector 13 returns to step S11. When determining that the position of the marker 61 is within the designated area 81 (YES in step S16), the detector 13 shifts to step S17. In step S17, the processing unit 14 causes the projection device 20 to display an image from the input source 2 corresponding to the marker 61 based on the correspondence data 18. That is, the processing unit 14 causes the interface 41 to select the input source 2 corresponding to the marker 61 and causes the projection device 20 to display an image based on the selected input source 2.

Meanwhile, when determining in step S14 that the feature of the marker 61 detected in detector 13 is not set to correspond to the input source 2 (NO in step S14), the detector 13 shifts to step S18.

In step S18, the processing unit 14 determines whether the projection device 20 is currently displaying an image in the projection area PA or not. When determining that the projection device 20 is not currently displaying an image in the projection area PA (NO in step S18), the processing unit 14 shifts to step S19. In step S19, the processing unit 14 notifies that there is no input source 2 by displaying a message that there is no input source, or the like.

The method of notification by the controller 10 is, for example, displaying a message in the form of an OSD. In this case, the processing unit 14 may stop displaying the image displayed in the projection area PA and turn the entirety of the projection area PA into black or a predetermined single color. The method of notification may also be, for example, notifying by sound, flashing the currently displayed projection image 71, or the like.

When determining that the projection device 20 is currently displaying an image in the projection area PA (YES in step S18), the processing unit 14 shifts to step S20. In step S20, the processing unit 14 causes the projection device 20 to display a setting guide image showing the set area 82. The setting guide image is an image showing the position and size of the set area 82 and is, for example, an image of the frame of the set area 82 shown in FIG. 3. The color of the setting guide image and the thickness of the frame are arbitrary. However, it is desirable that the setting guide image is visually distinguishable from the image currently displayed in the projection area PA by the projector 1 and the background color of the screen SC. In step S20, for example, the processing unit 14 causes the image processing circuit 42 to execute OSD processing and thus generate the setting guide image. The setting guide image is equivalent to an example of a detection guide image.

After the setting guide image is displayed, in step S21, the detector 13 determines whether the position of the marker 61 is within the set area 82 shown in the setting guide image or not.

When determining that the position of the marker 61 is not within the set area 82 (NO in step S21), the detector 13 returns to step S11. When determining that the position of the marker 61 is within the set area 82 (YES in step S21), the detector 13 shifts to step S22. In step S22, the processing unit 14 performs processing to establish the correspondence between the input source 2 of the image currently displayed in the projection area PA and the feature of the marker 61. In step S22, the processing unit 14 generates or updates the correspondence data 18, based on the result of the processing to establish the correspondence. Subsequently, in step S23, the processing unit 14 notifies that the correspondence is successfully established. In step S23, for example, the processing unit 14 causes the image processing circuit 42 to execute OSD processing and display an image showing that the correspondence is successfully established, and thus gives the notification.

In step S17, when image data is not inputted to the interface 41 from the input source 2 corresponding to the marker 61 based on the correspondence data 18, the processing unit 14 may notify that no image data is inputted.

In step S17, the processing unit 14 may notify that an image corresponding to the marker 61 is displayed. The notification by the processing unit 14 may be given before the image corresponding to the marker 61 is displayed.

When determining in step S16 that the marker 61 is within the designated area 81 (YES in step S16), the detector 13 may give a notification before shifting to step S17.

The detector 13 may display the designation guide image showing the designated area 81 before detecting the marker 61 in step S11. The detector 13 may display the setting guide image showing the set area 82 before detecting the marker 61 in step S11.

Figure 5:
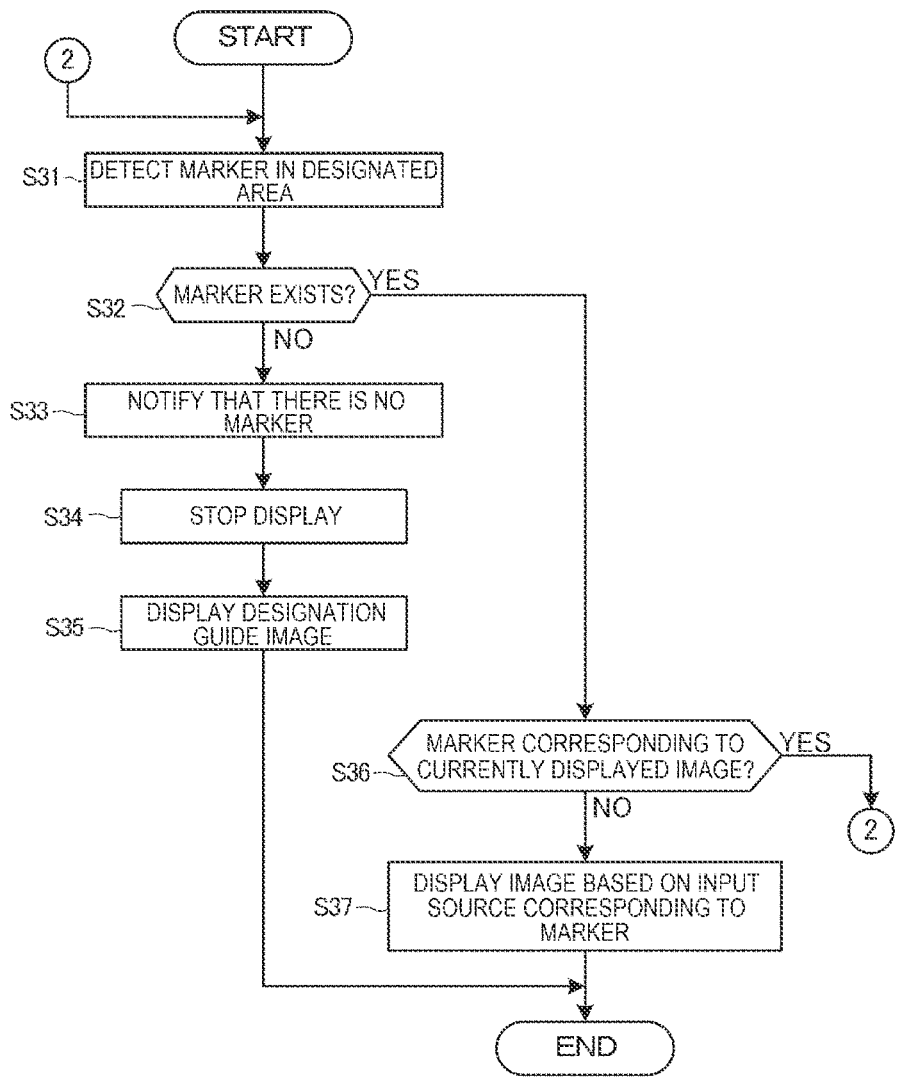
FIG. 5 is a flowchart showing an operation of the projector.

FIG. 5 is a flowchart showing an operation of the projector 1. Specifically, FIG. 5 shows the operation of the projector 1 after the image is displayed in step S17 in response to the placement of the marker 61 in the designated area 81.

While the image is displayed, in step S31, the detector 13 attempts to detect the marker 61 in the designated area 81. When determining that there is no marker 61 in the designated area 81 (NO in step S32), the detector 13 shifts to step S33. In step S33, the processing unit 14 notifies that there is no marker 61. Subsequently, in step S34, the processing unit 14 causes the projection device 20 to stop displaying the image. In step S35, the processing unit 14 causes the projection device 20 to display the designation guide image, and then ends this processing.

When determining that the marker exists in the designated area 81 (YES in step S32), the detector 13 shifts to step S36. In step S36, the processing unit 14 determines whether the marker 61 detected by the detector 13 is the marker 61 having the feature corresponding to the input source 2 of the currently displayed image or not.

When determining that the detected marker 61 is the marker 61 corresponding to the input source 2 of the currently displayed image (YES in step S36), the processing unit 14 returns to step S31.

When determining that the detected marker 61 is not the marker 61 having the feature corresponding to the input source 2 of the currently displayed image (NO in step S36), the processing unit 14 shifts to step S37. In step S37, the processing unit 14 causes the projection device 20 to display an image corresponding to the feature of the marker 61 detected by the detector 13 in step S31. Specifically, in step S37, the processing unit 14 causes the input source 2 corresponding to the feature of the marker 61 detected by the detector 13 in step S31, to be selected. The processing unit 14 causes the projection device 20 to display an image based on the selected input source 2. Thus, in step S37, the projection image 71 currently displayed in the projection area PA is switched to the projection image 71 corresponding to the marker 61.

4. Second Operation Mode of Projector

Figure 6:
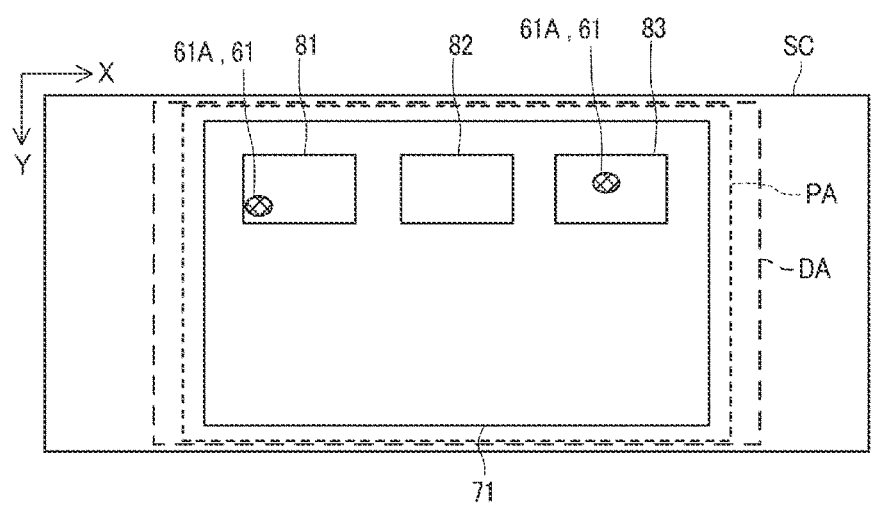
FIG. 6 is an explanatory view showing a second operation mode of the projector.

FIG. 6 is an explanatory view showing a second operation mode of the projector 1.

In the second operation mode, one designated area 81, one set area 82, and a confirmation area 83 are set on the detection surface DA. The positions and sizes of the designated area 81 and the set area 82 are the same as in the first operation mode. The confirmation area 83 may be located within the projection area PA or outside the projection area PA. In the projection area PA, one projection image 71 is displayed. The confirmation area 83 is equivalent to an example of an auxiliary detection area.

The confirmation area 83 is an area used for confirmation when the marker 61 is placed in the designated area 81 and when the marker 61 is placed in the set area 82.

In the first operation mode, the processing unit 14 performs processing when the marker 61 is placed in the designated area 81 and when the marker 61 is placed in the set area 82. Meanwhile, in the second operation mode, when the marker 61 having the same feature is placed in the designated area 81 and the confirmation area 83, the processing unit 14 performs processing corresponding to the placement of the marker 61 in the designated area 81.

For example, in the example shown in FIG. 6, the marker 61A is placed in the designated area 81 and the marker 61A having the same feature as the marker 61A in the designated area 81 is placed in the confirmation area 83. The marker 61A in the designated area 81 is equivalent to an example of the first marker. The marker 61A in the confirmation area 83 is equivalent to an example of the second marker. In this case, the processing unit 14 performs processing corresponding to the placement of the marker 61A in the designated area 81.

Also, in the second operation mode, when the marker 61 having the same feature is placed in the set area 82 and the confirmation area 83, the processing unit 14 performs processing corresponding to the placement of the marker 61 in the set area 82.

Figure 7:
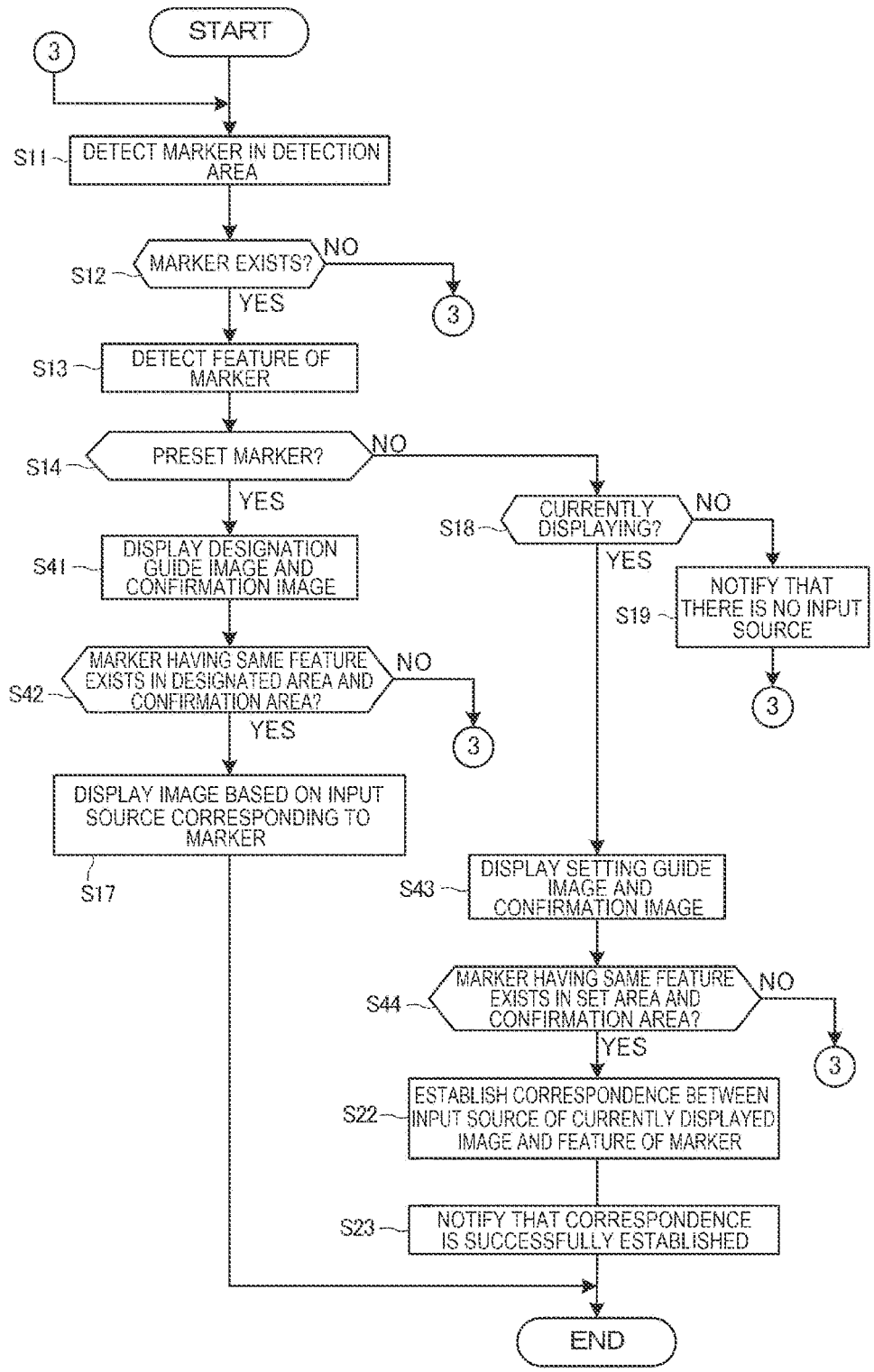
FIG. 7 is a flowchart showing an operation of the projector.

FIG. 7 is a flowchart showing an operation of the projector 1. FIG. 7 shows the operation of the projector 1 in the second operation mode. In the operation shown in FIG. 7, the same processing steps as in FIG. 5 are denoted by the same step numbers and are not described further in detail.

In the second operation mode, processing of steps S41 and S42 is executed instead of steps S15 and S16 in the first operation mode shown in FIG. 5.

In step S41, the processing unit 14 causes the projection device 20 to display the designation guide image showing the designated area 81 and a confirmation image showing the confirmation area 83, and then shifts to step S42. The confirmation image is an image showing the position and size of the confirmation area 83 and is, for example, an image of the frame of the confirmation area 83 shown in FIG. 6. The color of the confirmation image and the thickness of the frame are arbitrary. However, it is desirable that the confirmation image is visually distinguishable from the image currently displayed in the projection area PA by the projector 1 and the background color of the screen SC. In step S41, for example, the processing unit 14 causes the image processing circuit 42 to execute OSD processing and thus generate the confirmation image.

In step S42, the detector 13 determines whether the marker 61 having the same feature exists in the designated area 81 and the confirmation area 83 or not. When determining that the marker 61 having the same feature does not exist in the designated area 81 and the confirmation area 83 (NO in step S42), the detector 13 returns to step S11.

When determining that the marker 61 having the same feature exists in the designated area 81 and the confirmation area 83 (YES in step S42), the detector 13 shifts to step S17.

In the second operation mode, processing of steps S43 and S44 is executed instead of steps S20 and S21 in the first operation mode shown in FIG. 5.

In step S43, the processing unit 14 causes the projection device 20 to display the setting guide image and the confirmation image, and then shifts to step S44.

In step S44, the detector 13 determines whether the marker 61 having the same feature exists in the set area 82 and the confirmation area 83 or not. When determining that the marker 61 having the same feature does not exist in the set area 82 and the confirmation area 83 (NO in step S44), the detector 13 returns to step S11.

When determining that the marker 61 having the same feature exists in the set area 82 and the confirmation area 83 (YES in step S44), the detector 13 shifts to step S22.

In the second operation mode, the processing unit 14 performs processing on condition that the marker 61 having the same feature is placed in the designated area 81 and the confirmation area 83 or that the marker 61 having the same feature is placed in the set area 82 and the confirmation area 83. Therefore, the establishment of the correspondence by the processing unit 14 or the selection of the input source 2 due to erroneous detection of the marker 61 can be prevented. A specific example of the erroneous detection may be that the user places the marker 61 in the designated area 81 or the set area 82 by mistake or that a foreign object having a similar shape to the marker 61 is detected in the designated area 81 or the set area 82. Thus, executing the second operation mode is advantageous in that an operation based on the erroneous detection can be restrained.

5. Third Operation Mode of Projector

Figure 8:
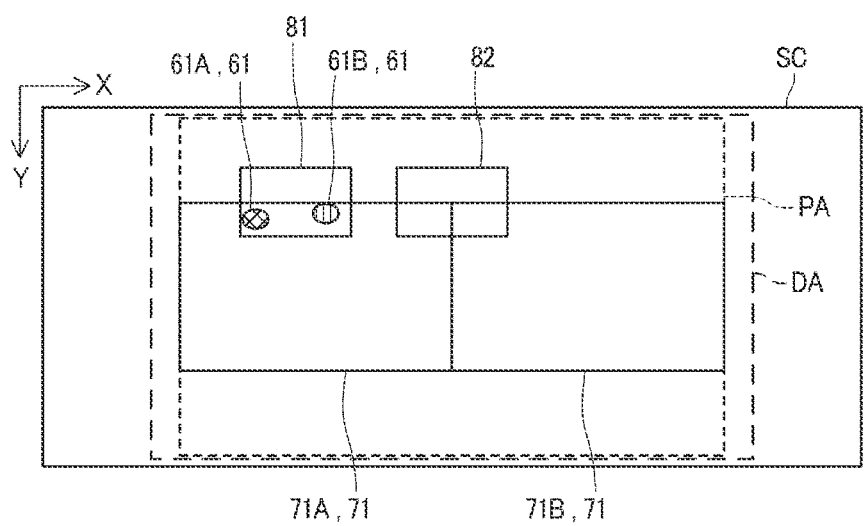
FIG. 8 is an explanatory view showing a third operation mode of the projector.

FIG. 8 is an explanatory view showing a third operation mode of the projector 1.

The projector 1 has a display mode where a plurality of images are displayed in the projection area PA. For example, the projector 1 can execute a two-screen display mode where two projection images 71A, 71B are displayed next to each other in the projection area PA, as shown in FIG. 8. The projection images 71A, 71B are images based on different input sources 2. The projector 1 may also be able to execute a four-screen display mode where four images are displayed next to each other in the projection area PA.

The third operation mode is an operation mode using the designated area 81 and the set area 82 in the two-screen display mode or the four-screen display mode. In the example shown in FIG. 8, the designated area 81 and the set area 82 are arranged on the detection surface DA.

In the third operation mode, the projector 1 displays the projection image 71A, based on the input source 2 corresponding to the marker 61A placed in the designated area 81. This operation is similar to the operation described with reference to FIGS. 4 and 5.

In the third operation mode, when the marker 61B is placed along with the marker 61A in the designated area 81, the projector 1 displays the projection image 71B, based on the input source 2 corresponding to the marker 61B.

In this way, when it is detected that a plurality of markers 61A, 61B are placed in the designated area 81 during the execution of the display mode where a plurality of projection images 71A, 71B can be displayed in the projection area PA, the projector 1 displays the plurality of projection images 71A, 71B. The projection images 71A, 71B displayed by the projector 1 are images based on the input sources 2 corresponding respectively to the features of the markers 61A, 61B placed in the designated area 81. Also, for example, during the execution of a display mode where four images can be displayed, the projector 1 can display four images based on the input sources 2 corresponding to four markers 61.

During the execution of the third operation mode, the projector 1 may increase or decrease images displayed in the projection area PA, according to the number of markers 61 placed in the designated area 81. For example, when the marker 61B is no longer detected in the designated area 81 in the state shown in FIG. 8, the processing unit 14 may stop displaying the projection image 71B and switch to the state where only the projection image 71A is displayed in the projection area PA. In this case, the processing unit 14 may display only the projection image 71A in the entirety of the projection area PA, for example, as shown in FIG. 3.

Also, when it is detected that the marker 61 is placed in the set area 82 during the execution of the third operation mode, the processing unit 14 establishes the correspondence between the marker 61 and the input source 2. In this case, the processing unit 14 performs processing to establish the correspondence between the input source 2 of one of the projection images 71A, 71B and the marker 61 placed in the set area 82.

The candidate for the input source 2 made to correspond to the marker 61 by the processing unit 14 is either the input source 2 corresponding to the projection image 71A or the input source 2 corresponding to the projection image 71B. The processing unit 14 may allow the user to select the input source 2 to correspond to the marker 61. The processing unit 14 may also establish the correspondence between the input source 2 of the image not corresponding to the marker 61 placed in the designated area 81, of the projection images 71A, 71B, and the marker 61 placed in the set area 82. The processing unit 14 may also establish the correspondence between the image displayed in the projection area PA at the later timing, of the projection images 71A, 71B, and the marker 61 placed in the set area 82.

6. Fourth Operation Mode of Projector

Figure 9:
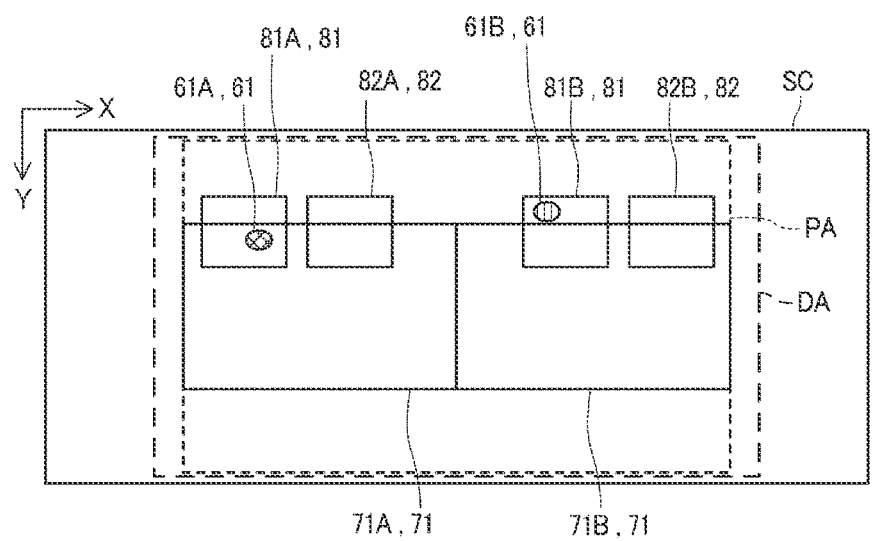
FIG. 9 is an explanatory view showing a fourth operation mode of the projector.

FIG. 9 is an explanatory view showing a fourth operation mode of the projector 1.

The fourth operation mode is equivalent to the display mode where the projector 1 displays a plurality of images, similarly to the third operation mode. FIG. 9 shows the two-screen display mode, where the projector 1 displays two projection images 71A, 71B next to each other in the projection area PA.

In the fourth operation mode, the detector 13 provides a designated area 81A and a set area 82A corresponding to the projection image 71A, and a designated area 81B and a set area 82B corresponding to the projection image 71B. The designated area 81A is equivalent to an example of a first designated area. The designated area 81B is equivalent to an example of a second designated area. The projection image 71A is equivalent to an example of a first image. The projection image 71B is equivalent to an example of a second image.

When it is detected by the detector 13 that the marker 61A is placed in the designated area 81A during the execution of the fourth operation mode, the processing unit 14 displays the projection image 71A based on the input source 2 corresponding to the feature of the marker 61A. When it is detected by the detector 13 that the marker 61B is placed in the designated area 81B during the execution of the fourth operation mode, the processing unit 14 displays the projection image 71B based on the input source 2 corresponding to the feature of the marker 61B.

When it is detected by the detector 13 that the marker 61A is placed in the set area 82A during the execution of the fourth operation mode, the processing unit 14 establishes the correspondence between the input source 2 corresponding to the projection image 71A and the feature of the marker 61A. When it is detected by the detector 13 that the marker 61B is placed in the set area 82B during the execution of the fourth operation mode, the processing unit 14 establishes the correspondence between the input source 2 corresponding to the projection image 71B and the feature of the marker 61B.

In the fourth operation mode, the detector 13 may indicate that the designated area 81A and the set area 82A are areas corresponding to the projection image 71A and that the designated area 81B and the set area 82B are areas corresponding to the projection image 71B.

7. Fifth Operation Mode of Projector

Figure 10:
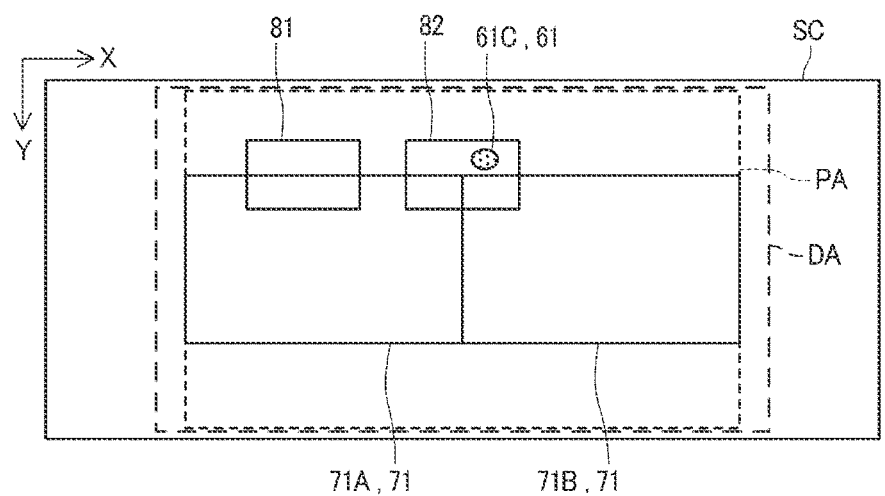
FIG. 10 is an explanatory view showing a fifth operation mode of the projector.

FIG. 10 is an explanatory view showing a fifth operation mode of the projector 1.

In the fifth operation mode, one designated area 81 and one set area 82 are arranged corresponding to the overall state of the projection area PA, as shown in FIG. 10.

When it is detected that the marker 61C is placed in the set area 82, the processing unit 14 performs processing to establish the correspondence between the marker 61C and the overall state of the projection area PA. In this case, the processing unit 14 establishes the correspondence between the feature of the marker 61C, the input source 2 corresponding to the projection image 71A, the input source 2 corresponding to the projection image 71B, and the display positions of the projection image 71A and the projection image 71B. Unlike in the first to fourth operation modes, the correspondence data 18 is information establishing the correspondence between the feature of the marker 61C, the input source 2 corresponding to the projection image 71A, the input source 2 corresponding to the projection image 71B, and the display positions of the projection image 71A and the projection image 71B.

When it is detected by the detector 13 that the marker 61C is placed in the designated area 81, the processing unit 14 refers to the correspondence data 18, based on the feature of the marker 61C. The processing unit 14 selects two input sources 2 according to the correspondence data 18 and causes the projection image 71A based on the first input source 2 as the first input source and the projection image 71B based on the input source 2 as the second input source, to be displayed at the positions designated by the correspondence data 18.

In this way, the projector 1 is not limited to the example of establishing the correspondence between the feature of the marker 61 and one input source 2 but also can make the overall state of the projection area PA to correspond thereto. The overall state of the projection area PA includes at least the input sources 2 of all the projection images 71 displayed in the projection area PA. When a plurality of projection images 71 are displayed in the projection area PA, the overall state of the projection area PA may include the relative positional relationship between the individual projection images 71. The overall state of the projection area PA may also include the number of projection images 71 displayed in the projection area PA.

The projector 1 may be able to execute at least one of the first to fifth operation modes.

The projector 1 may also be able to switch between and execute a plurality operation modes, of the first to fifth operation modes. The combination of operation modes executable by the projector 1 in this case is not limited. The switching between operation modes in this case may be carried out in response to an operation on the remote controller or the operation panel 47 by the user or may be automatically carried out by the projector 1. For example, when the display mode of the projector 1 is switched to the display mode where a plurality of projection images 71 are displayed, the operation mode with respect to the marker 61 may be automatically switched to the third, fourth or fifth operation mode.

The projector 1 may also be able to execute a plurality of operation modes combined together, of the first to fifth operation modes. For example, the projector 1 is made to execute the processing to establish the correspondence between the feature of the marker 61 and the input source 2 and thus generate the correspondence data 18 in the first operation mode. Using this correspondence data 18, the projector 1 can display the projection image 71 of the input source 2 corresponding to the marker 61 in the second to fourth operation modes. The combination of operation modes and the execution order are arbitrary.

8. Effects of Embodiment

As described above, the image display method executed by the projector 1 includes displaying, on the screen SC, the projection image 71A based on image data outputted from the input source 2. The image display method also includes detecting that the marker 61 is placed in the set area 82 included in the detection surface DA. The image display method also includes establishing the correspondence between the feature of the first marker and the first input source when it is detected that the first marker is placed in the set area 82 while the first image is displayed on the screen SC. For example, the image display method includes displaying the projection image 71A as the first image on the screen SC, based on image data outputted from the input source 2A as the first input source, and detecting that the marker 61A as the first marker is placed in the set area 82. The image display method also includes establishing the correspondence between the feature of the marker 61A and the input source 2A when it is detected that the marker 61A is placed in the set area 82 while the projection image 71A is displayed on the screen SC.

According to the image display method by the projector 1, placing the marker 61 in the set area 82 leads to the establishment of the correspondence between the feature of the marker 61 and the input source 2. Thus, the user can easily carry out the work of establishing the correspondence between the marker 61 and the input source 2.

In the display method, the set area 82 may include at least a part of the screen SC. In this case, the projector 1 detects that the marker 61 is placed on the screen SC displaying an image and then executes processing. Therefore, the user can carry out the work of establishing the correspondence between the marker 61 and the input source 2 without moving away from the screen SC.

The display method includes displaying the setting guide image showing the set area 82, on the screen SC. Thus, the user can easily place the marker 61 at a proper position. Therefore, the user can more easily carry out the work of establishing the correspondence between the marker 61 and the input source 2.

The display method may also include giving an indication showing that the correspondence is successfully established, after establishing the correspondence between the feature of the marker 61 and the input source. For example, an indication showing that the correspondence is successfully established may be given after the correspondence between the feature of the marker 61A as the first marker and the input source 2A as the first input source is established. In this case, the user can be notified that the correspondence between the marker 61 and the input source 2 is successfully established.

The display method includes detecting that the marker 61 is placed in the designated area 81 included in the detection surface DA, and displaying, on the screen SC, an image based on image data outputted from the input source 2 corresponding to the feature of the marker 61 detected in the designated area 81. For example, the display method includes detecting that the marker 61A is placed in the designated area 81 as the first designated area, and displaying, on the screen SC, the projection image 71A based on the first image data outputted from the input source 2A corresponding to the feature of the marker 61A. Thus, the user can display a desired image on the screen SC by placing the marker 61 in the designated area 81.

The display method includes stopping the display of the projection image 71 when the marker 61 is not detected in the designated area 81 while the projection image 71 is displayed on the screen SC. For example, when the marker 61A is not detected in the designated area 81 while the projection image 71A is displayed on the screen SC, the display of the projection image 71A is stopped. Therefore, the user can stop the display of the projection image 71 by removing the marker 61 from the designated area 81.

The display method may include stopping the display of the image and displaying the designation guide image showing the designated area 81, when the marker 61 is not detected in the designated area 81 while the projection image 71 is displayed on the screen SC. For example, when the marker 61A is not detected in the designated area 81 while the projection image 71A is displayed on the screen SC, the display of the projection image 71A is stopped and the designation guide image showing the designated area 81 is displayed. In this case, the user can more easily carry out an operation to display a new image on the screen SC.

In the display method, the screen SC includes a first display area and a second display area for displaying an image, and the designated area 81B as the second designated area corresponding to the second display area. The display method includes displaying, in the first display area, the projection image 71A based on the input source 2A corresponding to the feature of the marker 61A when the marker 61A is detected in the designated area 81A as the first designated area. The display method also includes displaying, in the second display area, the projection image 71A based on the input source 2A corresponding to the feature of the marker 61A when the marker 61A is detected in the designated area 81B. Thus, when a plurality of display areas for displaying the projection image 71 exist on the screen SC, the projection image 71 based on image data from the input source 2 desired by the user can be displayed in a desired display area, using the marker 61.

The display method also includes displaying the projection image 71B based on the second image data outputted from the input source 2 as the second input source, in the second display area included in the screen SC. The display method includes establishing the correspondence between the relative position of the projection image 71A as the first image and the projection image 71B as the second image, the first input source 2, the second input source 2, and the feature of the marker 61, when it is detected that the marker 61 as the first marker is placed in the designated area 81. Thus, the entirety of the display state where a plurality of images are displayed on the screen SC can be made to correspond to the feature of the marker 61. Therefore, the user can reproduce the display state of the entirety of the screen SC by placing the marker 61 in the designated area 81.

The display method includes detecting that the marker 61A as the first marker is placed in the designated area 81 as the first designated area. The display method includes displaying, on the screen SC, the projection image 71A based on the first image data outputted from the input source 2 as the first input source corresponding to the marker 61A as the first marker in the designated area 81 and the projection image 71B based on the second image data outputted from the input source 2 as the second input source, according to the relative position corresponding to the marker 61A. Thus, the entirety of the display state where a plurality of images are displayed on the screen SC can be made to correspond to the feature of the marker 61. Therefore, the user can reproduce the display state of the entirety of the screen SC by placing the marker 61 in the designated area 81.

The display method includes establishing the correspondence between the feature of the marker 61A and the input source 2, when it is detected that the marker 61A as the first marker is placed in the set area 82 and it is detected that the marker 61A as the second marker having the same feature as the marker 61A is placed in the confirmation area 83 included in the detection surface DA. Thus, a change in the settings due to an erroneous operation or erroneous detection as in the case where the user places the marker 61 in the set area 82 by mistake can be prevented. The user can easily set the correspondence between the marker 61A and the input source 2 by placing the marker 61A in the set area 82 and placing the marker 61A in the confirmation area 83.

The display method includes displaying, on the screen SC, the projection image 71A based on the first image data outputted from the input source 2 corresponding to the feature of the marker 61A, when it is detected that the marker 61A as the first marker is placed in the designated area 81 and it is detected that the marker 61A as the second marker having the same feature as the marker 61A is placed in the confirmation area 83 included in the detection surface DA. Thus, a change in the display due to an erroneous operation or erroneous detection as in the case where the user places the marker 61 in the designated area 81 by mistake can be prevented. The user can easily display an image based on image data outputted from the input source 2 corresponding to the marker 61A, by placing the marker 61A in the designated area 81 and placing the marker 61A in the confirmation area 83.

The display method includes determining whether the correspondence between the feature of the marker 61A and the input source 2 is established or not, when it is detected that the marker 61A as the first marker is placed in the designated area 81. The display method includes displaying, on the screen SC, the projection image 71A based on the image data outputted from the input source 2 corresponding to the feature of the marker 61A when it is determined that the correspondence between the feature of the marker 61A and the input source 2 is established. The display method includes establishing the correspondence between the feature of the marker 61A and the input source 2 when it is determined that the correspondence between the feature of the marker 61A and the input source 2 is not established. Thus, the projection image 71 is displayed or set according to whether the marker 61 placed in the designated area 81 by the user is already set or not. Therefore, the user can simply place the marker 61 to perform the processing corresponding to the feature of the marker 61. This can further reduce the workload on the user.

The projector 1 has the projection device 20 including the light source 21, the modulation device 22 modulating light emitted from the light source 21 and thus emitting the image light PL, and the optical unit 23 projecting the image light PL onto the screen SC. The projector 1 includes the image capture device 30 capturing an image of the set area 82 included in the detection surface DA and outputting captured image data, and the processor 11. The projector 1 includes the detector 13 detecting that the marker is placed in the set area 82, and the processing unit 14. The processor 11 causes the projection device 20 to project the projection image 71A as the first image based on the first image data inputted from the input source 2 as the first input source. The processor 11 detects that the marker 61A is placed in the designated area 81, based on the captured image data from the image capture device 30, and establishes the correspondence between the feature of the marker 61A and the input source 2 when it is detected that the marker 61A is placed in the set area 82 while the projection image 71A is projected.

In the projector 1, placing the marker 61 in the set area 82 leads to the establishment of the correspondence between the feature of the marker 61 and the input source 2 corresponding to the currently displayed projection image 71. Thus, the user can easily carry out the work of establishing the correspondence between the marker 61 and the input source 2.

9. Other Embodiments

The foregoing embodiment is a specific example to which the present disclosure is applied. The present disclosure is not limited to this embodiment.

For example, in the embodiment, a configuration where the interface 41 selects the input source 2 under the control of the controller 10 is described. However, the method of selecting the input source 2 is not limited to this. For example, the memory 15 may store image data and the projection device 20 may be able to display an image based on this image data. In this case, the projector 1 uses the image data in the memory 15 as one input source 2.

In the embodiment, an example where the projector 1 optically detects the marker 61 is described. However, this is simply an example. For example, the projector 1 may be configured to detect the marker 61 on the detection surface DA by wireless communication. For example, the marker 61 may be formed by a Bluetooth beacon or an RFID tag and the projector 1 may receive a wireless signal from the marker 61 and thus detect the marker 61.

In the embodiment, a configuration where the projector 1 is used as an example of the display device is described. As the display device, for example, a liquid crystal monitor or a liquid crystal television set displaying an image on a liquid crystal display panel may be used. Also, as the display device, an OLED (organic light-emitting diode) or OEL (organic electroluminescence) display or the like may be used and a device using other display methods may be employed.

Each functional unit shown in FIG. 2 represents a functional configuration and is not limited to any specific form of installation. In the projector 1, a piece of hardware corresponding individually to each functional unit need not necessarily be installed. A single processor may be configured to execute a program to implement functions of a plurality of functional units. Also, a part of the functions implemented by software in the embodiment may be implemented by hardware. Alternatively, a part of the functions implemented by hardware may be implemented by software. Moreover, the specific detailed configuration of each of the other parts of the projection system 100 can be arbitrarily changed without departing from the scope of the present disclosure.

Also, for example, the processing steps in the operations shown in FIGS. 4, 5, and 7 are provided by dividing the processing according to the main content of the processing in order to facilitate the understanding of the operations of the projector 1. The way the processing is divided into steps and the names of the steps do not limit the present disclosure. The processing may be divided into more steps according to the content of the processing. Also, the processing may be divided in such a way that one step includes more processing. The order of the steps may be changed where appropriate, without departing from the scope of the present disclosure.

What is claimed is:

1. An image display method comprising:
    displaying, on a display surface, a first image based on first image data from a first input source; and
    establishing a first correspondence between a feature of a first marker and the first input source when it is detected that the first marker is placed in a detection area included in a detection surface while the first image is displayed on the display surface.

2. The image display method according to claim 1, wherein
    the detection area includes at least a part of the display surface.

3. The image display method according to claim 2, further comprising:
    displaying a detection guide image showing the detection area, on the display surface.

4. The image display method according to claim 1, further comprising:
    giving an indication that the first correspondence is successfully established, after the establishing the correspondence.

5. The image display method according to claim 1, further comprising:
    displaying the first image on the display surface when it is detected that the first marker is placed in a first designated area included in the detection surface after the establishing the first correspondence.

6. The image display method according to claim 5, further comprising:
    stopping the displaying of the first image when the first marker is not detected in the first designated area during the first image is displayed on the display surface.

7. The image display method according to claim 6, further comprising:
    displaying a designation guide image showing the first designated area when the first marker is not detected in the first designated area during the first image is displayed on the display surface.

8. The image display method according to claim 5, wherein
    the display surface includes a first display area and a second display area,
    the detection surface includes a second designated area corresponding to the second display area,
    the displaying the first image on the display surface when it is detected that the first marker is placed in the first designated area includes displaying the first image in the first display area, and
    the method further comprises displaying the first image in the second display area when the first marker is detected in the second designated area after the establishing the first correspondence between the feature of the first marker and the first input source.

9. The image display method according to claim 5, wherein
    the displaying the first image on the display surface when it is detected that the first marker is placed in the first designated area includes displaying the first image on the display surface when it is detected that the first marker is placed in the first designated area and that a second marker having a feature that is the same as the feature of the first marker is placed in an auxiliary detection area included in the detection surface, after the establishing the first correspondence.

10. The image display method according to claim 5, further comprising:
determining whether the first correspondence is established or not, when it is detected that the first marker is placed in the first designated area;
displaying the first image on the display surface when it is determined that the first correspondence is established; and
establishing the first correspondence when it is determined that the first correspondence is not established.

11. The image display method according to claim 1, further comprising:
displaying a second image based on second image data from a second input source, on the display surface; and
establishing a second correspondence between a relative position of the first image and the second image, the first input source, the second input source, and the feature of the first marker, when it is detected that the first marker is placed in the detection area.

12. The image display method according to claim 11, further comprising:
displaying the first image and the second image on the display surface according to the relative position when it is detected that the first marker is placed in a first designated area included in the detection surface after the establishing the second correspondence.

13. The image display method according to claim 1, wherein
the establishing the first correspondence includes establishing the first correspondence between the feature of the first marker and the first input source when it is detected that the first marker is placed in the detection area and that a second marker having a feature that is the same as the first marker is placed in an auxiliary detection area included in the detection surface.

14. A projector comprising:
a projection device including
a light source,
a modulation device modulating light emitted from the light source to emit image light, and
an optical projection system projecting the image light onto a display surface;
an image capture device outputting captured image data by capturing an image of a detection area included in a detection surface; and
at least one processor programmed to
project a first image based on first image data inputted from a first input source, using the projection device, and
establish a first correspondence between a feature of a first marker and the first input source when it is detected that the first marker is placed in the detection area, based on the captured image data, while the first image is projected.

15. The projector according to claim 14, wherein
the detection area includes at least a part of the display surface.

16. The projector according to claim 15, wherein the at least one processor is further programmed to
display a detection guide image showing the detection area, on the display surface.

17. The projector according to claim 14, wherein the at least one processor is further programmed to
give an indication that the first correspondence is successfully established, after establishing the correspondence.

18. The projector according to claim 14, wherein the at least one processor is further programmed to
display the first image on the display surface when it is detected that the first marker is placed in a first designated area included in the detection surface after establishing the first correspondence.

19. The projector according to claim 14, wherein the at least one processor is further programmed to
display a second image based on second image data from a second input source, on the display surface; and
establish a second correspondence between a relative position of the first image and the second image, the first input source, the second input source, and the feature of the first marker, when it is detected that the first marker is placed in the detection area.

20. The projector according to claim 14, wherein
to establish the first correspondence includes establishing the first correspondence between the feature of the first marker and the first input source when it is detected that the first marker is placed in the detection area and that a second marker having a feature that is the same as the first marker is placed in an auxiliary detection area included in the detection surface.

* * * * *